3,230,101
FUSED CAST REFRACTORY AND METHOD OF MAKING

Allen M. Alper, Corning, and Robert N. McNally, Horseheads, N.Y., assignors to Corhart Refractories Company, Louisville, Ky., a corporation of Delaware
No Drawing. Filed July 13, 1964, Ser. No. 382,336
5 Claims. (Cl. 106—62)

This application is a continuation-in-part of our co-pending application Serial No. 183,770 filed March 30, 1962, now abandoned, the latter application being a continuation-in-part of our now abandoned application Serial No. 140,775 filed September 26, 1961.

This invention relates to improvements in the production of fused cast alumina refractory having an essentially two-phase crystalline structure provided by minor quantities of alkaline earth metal oxide contained therein. As is well known, fused cast refractory is the type of refractory which is produced by melting a mass of refractory material of the desired composition, casting and cooling the molten refractory material to form a solidified refractory mass.

The addition of alkaline earth metal oxides (i.e., MgO, CaO, BaO and SrO) in a melt of alumina and in quantities of about 0.36 to 16.5 mole percent, by oxide analysis, have been found very desirable to prevent or greatly reduce the formation, in the refractory casting, of the highly oriented structure that occurs in single phase substantially pure cast alumina. This oriented structure is characterized by a pattern of elongated crystals on corundum mutually oriented substantially perpendicular to each face of the refractory casting and in which many large elongated void spaces exist between the mutually oriented crystals. This type of cast refractory has very poor thermal shock resistance and spalls readily. The alkaline earth metal oxide content causes a substantial formation, during solidification and cooling, of very small interlocking crystals of a second crystalline phase and corundum in lieu of the highly oriented structure of the single phase refractory; the second phase being spinel ($MgO \cdot Al_2O_3$) in the cast of MgO and being alkaline earth metal hexaluminate in the case of CaO, BaO and SrO (e.g., $CaO \cdot 6Al_2O_3$)

These essentially two-phase cast refractories are characterized by having a substantial degree of resistance to spalling due to thermal shock.

In manufacturing these two-phase fused cast refractories, considerable difficulty is encountered in obtaining merchantable cast product. It has been found that these refractories have a considerable tendency to crack during solidification and cooling in the mold. This tendency is particularly evident in blocks or billets of 100 pounds and heavier, especially in the more common commercial production billets of 300 to 1200 pounds. The cracks appear substantially as a network throughout the casting and in many cases, radiate outwardly from the center of the casting towards the edges and/or corners. These cracks in the casting are extremely undesirable because they greatly weaken the structural integrity of the cast product. When the casting is subjected to mechanical and/or thermal stresses, for example, during shipping or in service, or even during sawing of a billet into desired shapes, the cracks are caused to propagate until the cracks open up and a chunk spalls off.

Attempts to avoid the cracking effect in the two-phase fused cast refractories by means of the more conventional controlled slow cooling have met with little success.

It is an object of this invention to provide a method of producing thermal shock resistant, alkaline earth metal oxide-alumina fused cast refractory having a crystal structure comprising fine interlocking crystals of corundum and spinel and/or alkaline earth metal hexaluminate so that the refractory is substantially free from cracking during solidification and cooling.

It is another object of this invention to provide a substantially crack-free, thermal shock resistant, alkaline earth metal oxide-alumina fused cast refractory having a crystal structure comprising fine interlocking crystals of corundum and spinel and/or alkaline earth metal hexaluminate.

It is a further object of this invention to provide a method of producing thermal shock resistant, alkaline earth metal oxide-alumina fused cast refractory having a crystal structure comprising fine interlocking crystals of corundum and spinel and/or alkaline earth metal hexaluminate whereby the refractory will have an improved modulus of rupture.

It is a still further object of this invention to provide a thermal shock resistant, alkaline earth metal oxide-alumina fused cast refractory having a crystal structure comprising fine interlocking crystals of corundum and spinel and/or alkaline earth metal hexaluminate characterized by an improved modulus of rupture.

Other objects and advantages of the present invention will become apparent, to those skilled in the art, from the following detailed description.

We have discovered that the foregoing objects can be attained by incorporating fluorine in a molten refractory mass composed essentially of alkaline earth metal oxide and alumina, wherein the quantities of fluorine, alkaline earth metal oxide and alumina are proportioned to provide a melted refractory mixture consisting essentially of, in mole percent by analysis, 0.06% to 2.63% fluorine, 0.36% to 16.5% alkaline earth metal oxide, the mole percent of alkaline earth metal oxide substantially exceeding the mole percent of fluorine, and the balance substantially all alumina, and thereafter cooling the molten refractory to form a solidified refractory mass.

Castings, large and small, made in accordance with our invention are notably free of crack networks. Moreover, they possess the desirable characteristics of the corresponding refractory compositions not containing the fluorine addition, i.e. good thermal shock resistance and a crystal structure having fine interlocking crystals of corundum and spinel and/or alkaline earth metal hexaluminate. It is also notable in our novel fused cast product that the modulus of rupture is considerably higher than in the corresponding compositions omitting fluorine and amounts to almost a two-fold increase in strength in many cases.

The only difference in microstructure appearing in our novel fused cast refractory is the presence of very fine, randomly dispersed islands of a third crystal phase appearing usually within the spinel and hexaluminate crystals. This third phase appears or tends to be an alkaline earth metal fluoride. For example, when fluorine is incorporated by means of calcium fluoride, the calcium from this fluoride tends or appears to remain combined with fluorine as the fluoride in the fused cast product. When the source of fluorine is a fluoride other than an alkaline earth metal fluoride, the resulting fluorine content tends to combine with some of the calcium or other alkaline earth metal initially present in the refractory composition as an oxide. For this reason, not all the calcium or other alkaline earth metal is available to form the hexaluminate or spinel. Therefore, it is necessary that all the alkaline earth metal calculated as mole percent of the corresponding oxide should substantially exceed the mole percent of fluorine in the fused cast product.

In carrying out our invention, we prefer to use relatively pure sources of alumina, alkaline earth metal oxides and fluorine in order to avoid deleterious effects on the properties of our novel fused cast refractory. Certain impurities, such as alkali metal oxides (e.g., $Na_2O$), $SiO_2$, $Fe_2O_3$ and $TiO_2$, should be minimized because of their adverse effect on one or more of the following properties: resistance to hot load deformation, resistance to spalling due to thermal shock, and resistance to spalling resulting from a weakened structure caused by permanent growth during repeated heating and cooling of the refractory. As a general rule, these impurities should not exceed a total of 2 mole percent of the refractory.

As a source of fluorine, we prefer to use a metal fluoride, although any suitable source may be employed as desired, including bubbling fluorine gas through a molten mass of alumina and alkaline earth metal oxide. In using a metal fluoride, we prefer to mix it with the other refractory batch ingredients prior to melting; however, the fluoride may be added at any stage of the melting or pouring operations as desired, e.g. added to the molten refractory in the melting furnace just prior to pouring or placed in the mold prior to pouring.

Generally, the metal fluorides would be one of those having a boiling point of at least about 1200° C. because fluorides with too low a boiling point will excessively vaporize from the batch charge during the melting operation before they can fuse with the other ingredients. Thus, it has been determined, as a practical matter, that those metal fluorides with boiling points not substantially lower than 1200° C. will fuse into the molten pool formed during melting. Due to the low partial pressure of fluorine in the batch as a result of the lower concentration of fluorine when fused in the molten refractory and to the fact that equilibrium between the partial pressure of fluorine in the batch and above the bath does not occur in the relatively short fusion time before casting, a substantial amount of fluorine (e.g., over 70%) is retained in the batch at the time of casting.

Examples of suitable metal fluorides and their respective boiling points are as follows:

| Fluoride | $AlF_3$ | $MgF_2$ | $CaF_2$ | $BaF_2$ | $SrF_2$ | $NaF$ |
| --- | --- | --- | --- | --- | --- | --- |
| B.P., °C | 1,260 | 2,239 | 2,500 | 2,137 | 2,460 | 1,705 |

Mixtures or complex metal fluorides with sufficiently high boiling points can also be used, e.g., cryolite.

In the production of the fused cast refractory of the invention, the batch ingredients are first crushed into granular form if they are not commercially obtained already in that form. The batch materials are then proportioned in accordance with the desired composition for the refractory to be cast and are preferably premixed prior to charging into the melting furnace. Any of the well-known melting furnaces can be used, such as the combustion gas type (i.e., utilizing the heat from combustion of a fluid carbonaceous fuel and air) or of the electric arc type. The latter type is preferred. The charge is then melted, cast into suitable preformed molds and annealed according to the known conventional techniques, for example, those disclosed in U.S. Patent 1,615,-750 to G. S. Fulcher. Generally, the pouring temperature of the molten refractory is about 2030°–2050° C.

As a specific illustration of our invention, we have employed the following commercially available, granulated batch materials with the typical chemical analyses in percent by weight:

*Alumina*

$Al_2O_3$ _____ 99.2
$Na_2O$ _____ 0.45
$Fe_2O_3$ _____ 0.03
$SiO_2$ _____ 0.02
Other plus ignition loss _____ 0.3

*Fluorspar*

$CaF_2$ _____ 97.3
$CaCO_3$ _____ 1.2
$SiO_2$ _____ 1.1
$Fe_2O_3$ _____ 0.1
Ignition loss _____ 0.3

*Quicklime*

$CaO$ _____ 95.0
$SiO_2$ _____ 1.3
$MgO$ _____ 0.85
$Al_2O_3$, $Fe_2O_3$ _____ 0.85
Other _____ 0.7
Ignition loss _____ 1.3

*High purity $AlF_3$*

$AlF_3$ _____ 99+

These batch materials were appropriately proportioned, premixed prior to charging the furnace and melted by electric arc. The molten material was cast into preformed graphite molds and annealed by slow cooling in the mold. A series of melts made in this manner, in which the castings were free of crack networks, are shown below in Table I:

TABLE I

| Melt. No. | Batch Proportions in Parts by Weight | | Melted Mixture Composition[a] in Mole Percent by Analysis | |
| --- | --- | --- | --- | --- |
| 1 | Alumina | 99.3 | $Al_2O_3$ [b] | 98.48 |
|   | Quicklime | 0.35 | CaO | 1.06 |
|   | Fluorspar | 0.35 | Fluorine | 0.46 |
| 2 | Alumina | 98.7 | $Al_2O_3$ [b] | 97.67 |
|   | Quicklime | 0.8 | CaO | 1.44 |
|   | High Purity $AlF_3$ | 0.5 | Fluorine | 0.89 |
| 3 | Alumina | 99.06 | $Al_2O_3$ [b] | 98.15 |
|   | Quicklime | 0.74 | CaO | 1.59 |
|   | Fluorspar | 0.2 | Fluorine | 0.26 |
| 4 | Alumina | 98.81 | $Al_2O_3$ [b] | 97.36 |
|   | Quicklime | 0.52 | CaO | 1.76 |
|   | Fluorspar | 0.67 | Fluorine | 0.88 |
| 5 | Alumina | 97.8 | $Al_2O_3$ [b] | 95.58 |
|   | Quicklime | 1.53 | CaO | 3.55 |
|   | Fluorspar | 0.67 | Fluorine | 0.87 |

[a] The total Al and Ca calculated as the oxides.
[b] By difference and includes a maximum of 2 mole percent total impurities.

The good thermal shock resistance of our novel fused cast refractory is illustrated by the data in Table II below. This data is based on a rigorous test which consists of introducing a 1" x 1" x 3" sample of a casting into a furnace heated to 1650° C., holding the sample in the heat for 10 minutes and then removing it to cool to room temperature. This constitutes one cycle and this procedure is repeated until a piece of the sample has spalled off, at which point the number of cycles completed are noted. In order to show that the fluorine has no detrimental effect on thermal shock resistance, data is also given for two selected samples of castings having substantially comparable compositions except that they do not contain fluorine.

TABLE II

| Melt No. | Melted Mixture Composition in Mole Percent by Analysis | Thermal Shock Cycles |
| --- | --- | --- |
| 2 | 97.67% $Al_2O_3$, 1.44% CaO, 0.89% $F_2$ | 11 |
| 4 | 97.36% $Al_2O_3$, 1.76% CaO, 0.88% $F_2$ | 23 |
| A | 98.79% $Al_2O_3$, 1.21% CaO | 13 |
| B | 96.42% $Al_2O_3$, 3.58% CaO | 22 |

As was mentioned earlier, the addition of fluorine also provides an increase in strength. This is illustrated in Table III by a comparison of modulus of rupture values for casting samples of Melt Nos. 5 and B.

TABLE III

| Melt No.: | Modulus of Rupture, p.s.i. |
|---|---|
| 5 | 7,000 |
| B | 3,800 |

Optimum properties are obtained from our preferred refractory composed of a fused mixture consisting essentially of, in mole percent by analysis, 0.06% to 2.63% fluorine, 0.36% to 11.8% alkaline earth metal oxide, the mole percent of alkaline earth metal oxide being at least 1.5 times the mole percent of fluorine and the balance substantially all alumina. We particularly prefer CaO, as the alkaline earth metal oxide, in the range of 0.36 to 10.5 mole percent with the mole percent of CaO being at least 1.6 times the mole percent of fluorine for optimum thermal shock resistance.

The fused cast refractory of this invention is capable of many different applications, but it is deemed particularly suitable for use in steel melting, electric-arc furnace roofs, glass melting tank roofs, furnace checkers and high temperature metal annealing furnaces.

Although the present invention has been described with respect to specific details of certain embodiments thereof, it is not intended that such details be limitations upon the scope of the invention except insofar as set forth in the following claims.

We claim:

1. A method of producing a substantially crack-free, thermal shock resistant fused cast refractory having a crystal structure comprising fine interlocking crystals of corundum and at least one of the group consisting of spinel and alkaline earth metal hexaluminate, comprising incorporating fluorine in a molden refractory mass composed essentially of alkaline earth metal oxide and alumina, wherein the quantities of fluorine, alkaline earth metal oxide and alumina are proportioned to provide a melted refractory mixture consisting essentially of, in mole percent by analysis, 0.06% to 2.63% fluorine, 0.36% to 16.5% alkaline earth metal oxide, the mole percent of alkaline earth metal oxide substantially exceeding the mole percent of fluorine, and the balance substantially all alumina, and thereafter cooling the molten refractory to form a solidified refractory mass.

2. A fused cast refractory composed of a fused mixture consisting essentially of, in mole percent by analysis, 0.06% to 2.63% fluorine, 0.36% to 16.5% alkaline earth metal oxide, the mole percent of alkaline earth metal oxide substantially exceeding the mole percent of fluorine, and the balance substantially all alumina.

3. A substantially crack-free, thermal shock resistant fused cast refractory having a crystal structure comprising fine interlocking crystals of corundum and at least one of the group consisting of spinel and alkaline earth metal hexaluminate and composed of a fused mixture consisting essentially of, in mole percent by analysis, 0.06% to 2.63% fluorine, 0.36% to 16.5% alkaline earth metal oxide, the mole percent of alkaline earth metal oxide substantially exceeding the mole percent of fluorine, and the balance substantially all alumina.

4. A fused cast refractory composed of a fused mixture consisting essentially of, in mole percent by analysis, 0.06% to 2.63% fluorine, 0.36% to 11.8% alkaline earth metal oxide, the mole percent of alkaline earth metal oxide being at least 1.5 times the mole percent of fluorine, and the balance substantially all alumina.

5. A fused cast refractory composed of a fused mixture consisting essentially of, in mole percent by analysis, 0.06% to 2.63% fluorine, 0.36% to 10.5% calcium oxide, the mole percent calcium oxide being at least 1.6 times the mole percent of fluorine, and the balance substantially all alumina.

References Cited by the Examiner

UNITED STATES PATENTS

| 2,019,208 | 10/1935 | Baumann et al. | 106—62 |
| 2,235,077 | 3/1941 | McMullen | 106—62 |

TOBIAS E. LEVOW, *Primary Examiner.*

UNITED STATES PATENT OFFICE
CERTIFICATE OF CORRECTION

Patent No. 3,230,101　　　　　　　　　　　　　　January 18, 1966

Allen M. Alper et al.

It is hereby certified that error appears in the above numbered patent requiring correction and that the said Letters Patent should read as corrected below.

Column 5, line 32, for "molden" read -- molten --.

Signed and sealed this 17th day of May 1966.

(SEAL)
Attest:

ERNEST W. SWIDER
Attesting Officer

EDWARD J. BRENNER
Commissioner of Patents